US012355635B2

(12) United States Patent
Oba et al.

(10) Patent No.: US 12,355,635 B2
(45) Date of Patent: Jul. 8, 2025

(54) ANALYSIS DEVICE, ANALYSIS METHOD, AND ANALYSIS PROGRAM (71) Applicant: NIPPON TELEGRAPH AND TELEPHONE CORPORATION, Tokyo (JP)

(72) Inventors: Shosuke Oba, Tokyo (JP); Kazunori Kamiya, Tokyo (JP); Bo Hu, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/566,076

(22) PCT Filed: Jun. 4, 2021

(86) PCT No.: PCT/JP2021/021459
§ 371 (c)(1),
(2) Date: Nov. 30, 2023

(87) PCT Pub. No.: WO2022/254729
PCT Pub. Date: Dec. 8, 2022

(65) Prior Publication Data
US 2024/0380677 A1 Nov. 14, 2024

(51) Int. Cl.
*G06F 15/177* (2006.01)
*H04L 41/0816* (2022.01)
(Continued)

(52) U.S. Cl.
CPC .......... *H04L 41/22* (2013.01); *H04L 41/0816* (2013.01); *H04L 41/14* (2013.01)

(58) Field of Classification Search
CPC ...................................................... H04L 41/14
See application file for complete search history.

(56) References Cited

U.S. PATENT DOCUMENTS 12,174,963 B1 * 12/2024 Alamuri ................... G06F 8/20
2021/0042359 A1 2/2021 Nagayama et al.

FOREIGN PATENT DOCUMENTS

WO 2019168072 A1 9/2019

OTHER PUBLICATIONS

Jeh et al. (2003) "Scaling Personalized Web Search" WWW '03: Proceedings of the 12th International Conference on World Wide Web, May 2003, pp. 271-279, https://doi.org/10.1145/775152.775191.

(Continued)

*Primary Examiner* — Padma Mundur (57) ABSTRACT

An analysis device includes processing circuitry configured to generate a graph in which each IP host indicated in communication information is set as a node and communication between the each IP host is set as an edge on a basis of the communication information of a network, calculate a degree of relevance between a predetermined IP host and each IP host on the graph using the generated graph, correct the graph by adding or deleting an edge connecting each IP host on the graph on a basis of a degree of relevance between a predetermined IP host and each IP host on the graph, calculate a degree of relevance between the predetermined IP host and each IP host using the corrected graph, and output a degree of relevance between the predetermined IP host and each IP host.

8 Claims, 8 Drawing Sheets (51) Int. Cl.
*H04L 41/14* (2022.01)
*H04L 41/22* (2022.01)

(56) References Cited

OTHER PUBLICATIONS

Perozzi et al. (2014) "DeepWalk: Online Learning of Social Representations" KDD '14: Proceedings of the 20th ACM SIGKDD International Conference on Knowledge Discovery and Data Mining, Aug. 2014, pp. 701-710, https://doi.org/10.1145/2623330.2623732.

Uno et al. (2014) "Clustering by Clique Enumeration and Data Cleaning like Method" IPSJ Technical Report, vol. 2014-AL-146, No. 2, pp. 1-8, sections 1, 4.

\* cited by examiner

ANALYSIS DEVICE, ANALYSIS METHOD, AND ANALYSIS PROGRAM

CROSS-REFERENCE TO RELATED APPLICATIONS

This application is a U.S. 371 Application of International Patent Application No. PCT/JP2021/021459, filed on 4 Jun. 2021, the disclosure of which is hereby incorporated herein by reference in its entirety.

TECHNICAL FIELD

The present invention relates to an analysis device, an analysis method, and an analysis program for accurately extracting an IP host having a high degree of relevance to an IP host of interest.

BACKGROUND ART

Conventionally, there is a technology of creating a graph in which each IP host indicated in network (NW) flow information is set as a node and communication between each IP host is set as an edge from the NW flow information, and calculating a degree of relevance between an IP host of interest and each IP host. For example, the above-described technology includes score propagation (see Non Patent Literature 1) and graph embedding (see Non Patent Literature 2).

CITATION LIST

Non Patent Literature

Non Patent Literature 1: Glen Jeh and Jennifer Widom, "Scaling Personalized Web Search", 2003.
Non Patent Literature 2: Bryan Perozzi, Rami Al-Rfou, and Steven Skiena, "DeepWalk: Online Learning of Social Representations", 2014.

SUMMARY OF INVENTION

Technical Problem

Here, in the conventional method by score propagation, a degree of relevance between IP hosts arranged at a short distance in the above graph is excessively high. Furthermore, in the method by graph embedding, a degree of relevance between IP hosts arranged at a long distance in the above graph is excessively high. As a result, there is an issue that an IP host having a high degree of relevance to an IP host of interest (for example, malicious IP host) cannot be accurately extracted in the above graph.

Therefore, an object of the present invention is to solve the above-described issue and accurately extract an IP host having a high degree of relevance to an IP host of interest in a graph created from NW flow information.

In order to solve the above issue an analysis device includes: processing circuitry configured to: generate a graph in which each IP host indicated in communication information is set as a node and communication between the each IP host is set as an edge on a basis of the communication information of a network, calculate a degree of relevance between a predetermined IP host and each IP host on the graph using the generated graph, correct the graph by adding or deleting an edge connecting each IP host on the graph on a basis of a degree of relevance between a predetermined IP host and each IP host on the graph, calculate a degree of relevance between the predetermined IP host and each IP host using the corrected graph, and output a degree of relevance between the predetermined IP host and each IP host.

Advantageous Effects of Invention

According to the present invention, an IP host having a high degree of relevance to an IP host of interest can be accurately extracted in a graph created from NW flow information.

DESCRIPTION OF EMBODIMENTS

Hereinafter, a mode for carrying out the present invention (embodiment) will be described with reference to the drawings. The present invention is not limited to the embodiment described below.

[Operation Outline] First, an operation outline of an analysis device according to the present embodiment will be described with reference to FIG. 1. Here, a case where the analysis device extracts an IP host having a high degree of relevance to a malicious IP host will be described as an example.

First, the analysis device generates a graph in which each IP host indicated in NW flow information (communication information between each IP host of a network) is set as a node and communication between each IP host is set as an edge on the basis of the NW flow information. Then, the analysis device stores a node of a malicious IP host on the generated graph. Then, the analysis device calculates a degree of relevance between the malicious IP host and other each IP host in the graph using the generated graph.

Next, the analysis device corrects edges of the graph on the basis of a degree of relevance between the malicious IP host and the other each IP host. For example, in a case where there is no edge from the malicious IP host to an IP host having a degree of relevance to the malicious IP host equal to or greater than a predetermined value in the graph, the analysis device adds an edge from the malicious IP host to the IP host. For example, as illustrated in FIG. 1, in a case where there are no edges to IP hosts A and B having degrees of relevance to the malicious IP host equal to or greater than the predetermined value, the analysis device adds edges from the malicious IP host to the IP hosts A and B.

Then, the analysis device calculates a degree of relevance between the malicious IP host and other each IP host using the graph corrected as described above. In this way, the analysis device can accurately extract an IP host having a high degree of relevance to the malicious IP host in the graph created from the NW flow information.

Figure 1:
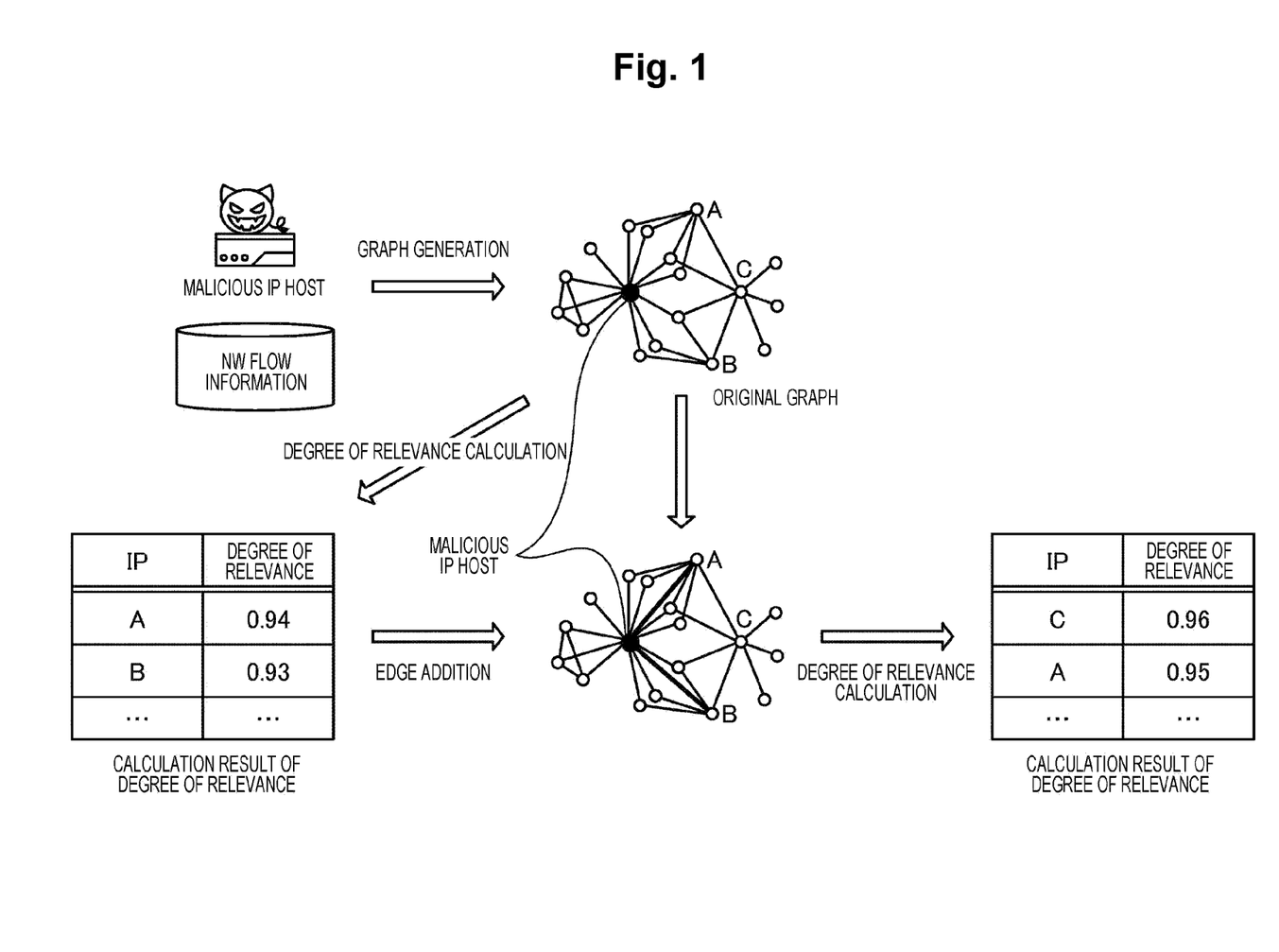
FIG. 1 is a diagram for describing an operation outline of an analysis device.

For example, by calculating a degree of relevance between the malicious IP host and other each IP host using the graph obtained by correcting the edges of the original graph of FIG. 1, the analysis device can extract an IP host having a degree of relevance to the malicious IP host is not high in the original graph (for example, IP host C adjacent to the IP hosts A and B) as an IP host having a high degree of relevance.

Figure 2:
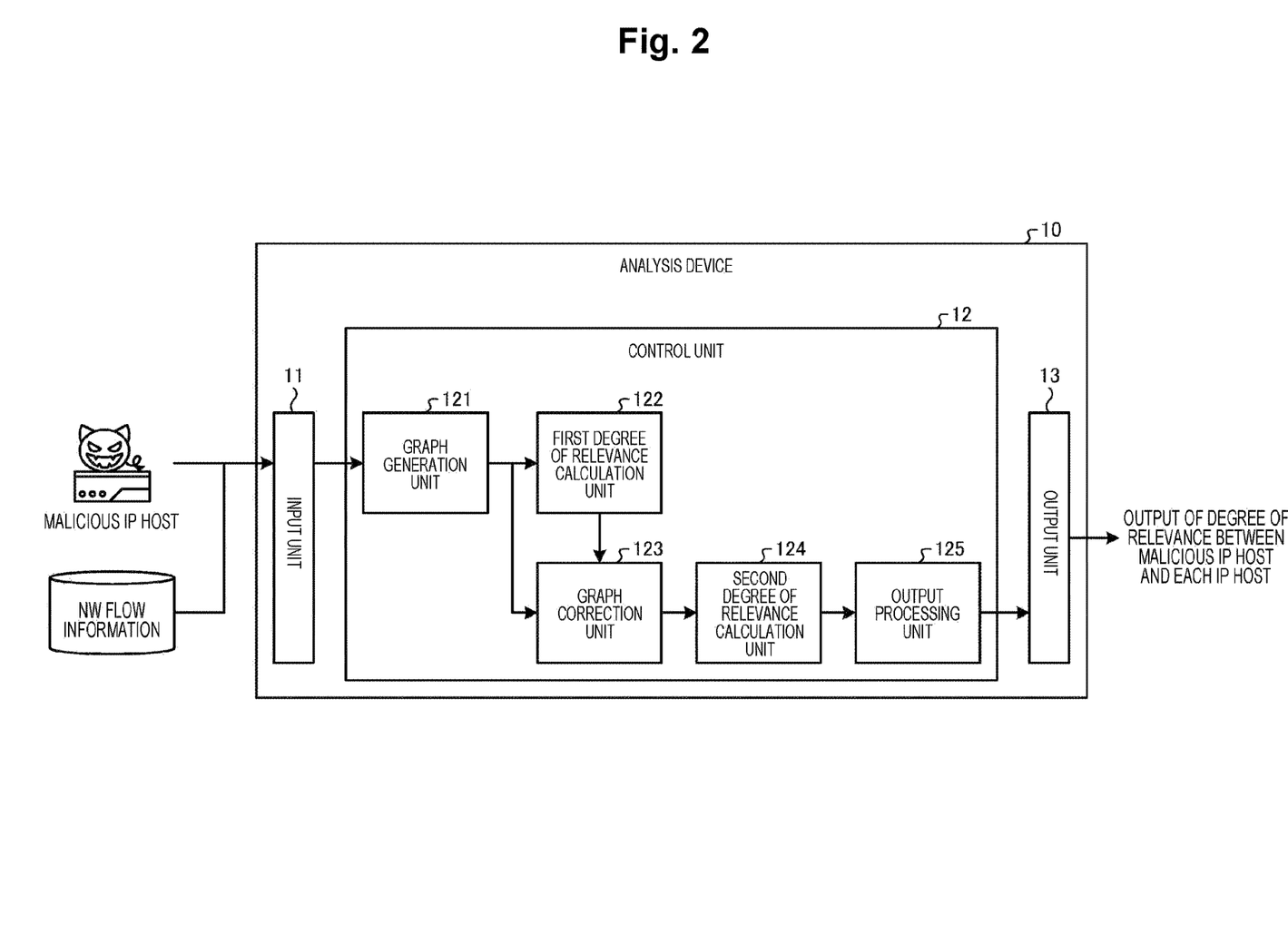
FIG. 2 is a diagram illustrating a configuration example of the analysis device.

[Configuration Example] Next, a configuration example of the analysis device will be described with reference to FIG. 2. The analysis device 10 includes an input unit 11, a control unit 12, and an output unit 13.

The input unit 11 receives inputs of various types of information used by the analysis device 10. For example, the input unit 11 receives inputs of NW flow information, an IP address of an IP host of interest (for example, malicious IP host), and the like.

The control unit 12 controls the entire analysis device 10. The control unit 12 includes, for example, a graph generation unit 121, a first degree of relevance calculation unit 122, a graph correction unit 123, a second degree of relevance calculation unit 124, and an output processing unit 125.

Figure 3:
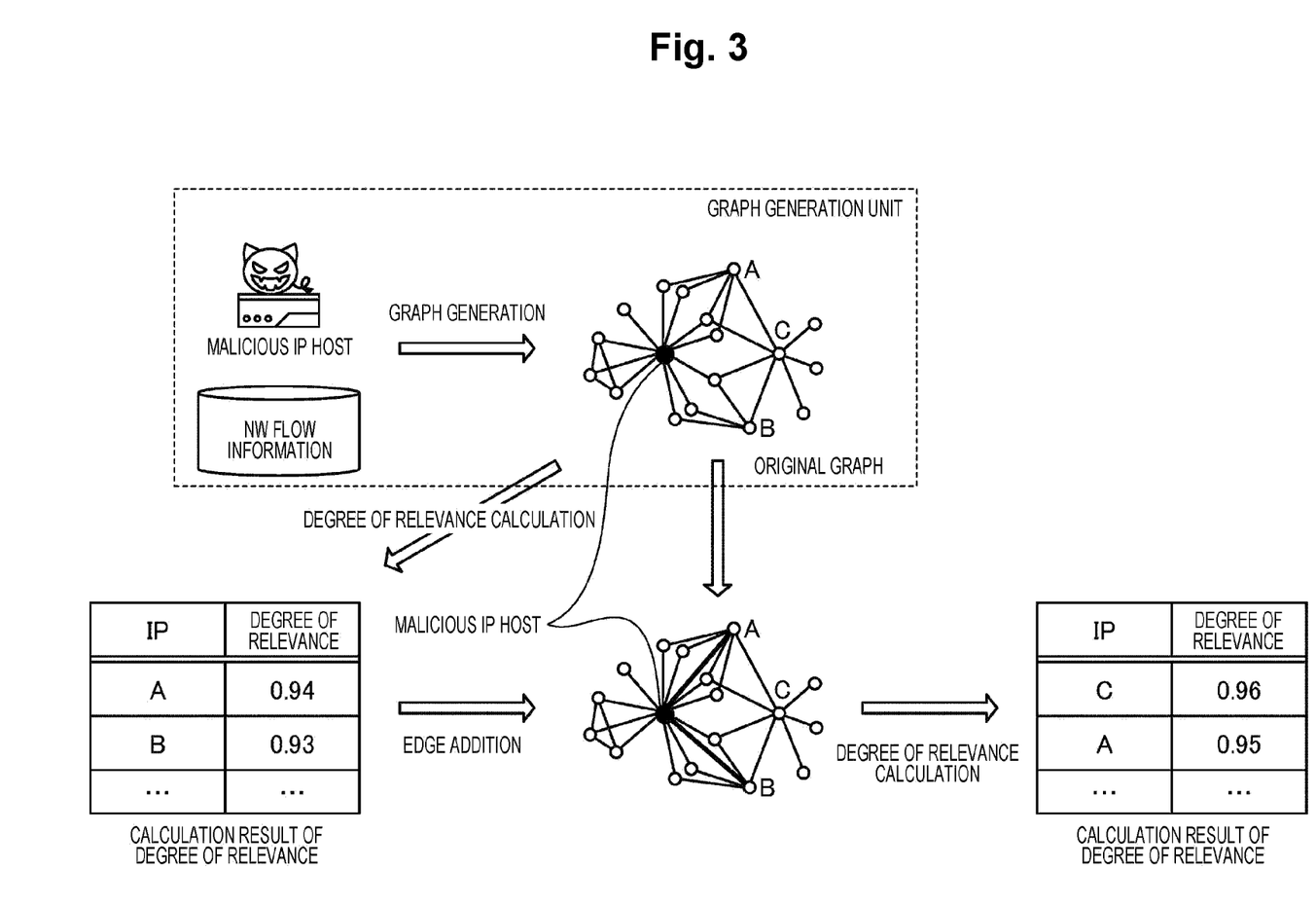
FIG. 3 is a diagram for describing a graph generation unit in FIG. 2.

The graph generation unit 121 generates a graph in which an IP host is set as a node and communication between IP hosts is set as an edge on the basis of the NW flow information. Furthermore, the graph generation unit 121 stores a node of the IP host of interest (for example, malicious IP host) on the generated graph (see FIG. 3).

Figure 4:
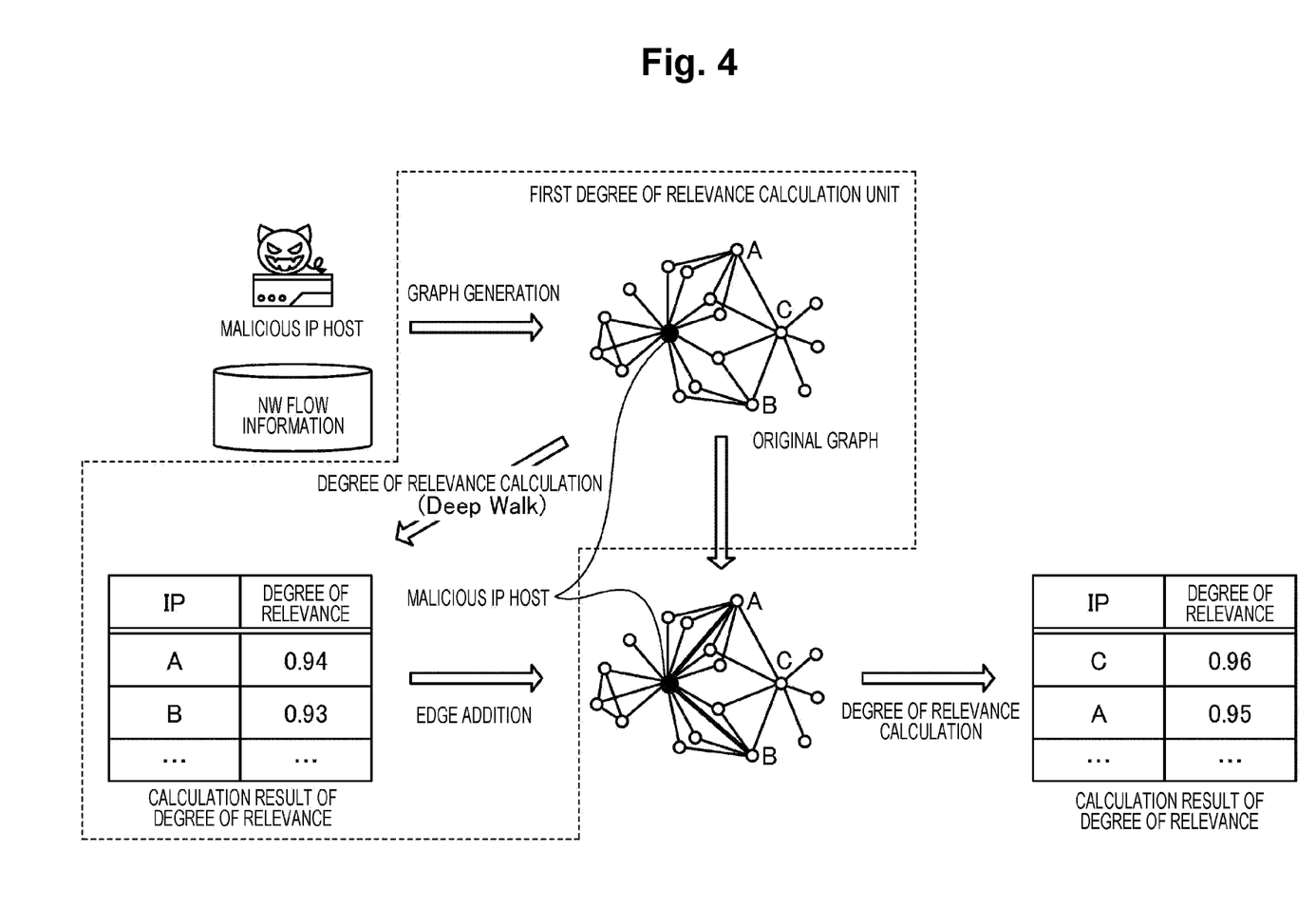
FIG. 4 is a diagram for describing a first degree of relevance calculation unit in FIG. 2.

The first degree of relevance calculation unit 122 calculates a degree of relevance between the IP host of interest and other each IP host using the graph generated by the graph generation unit 121. For example, the first degree of relevance calculation unit 122 calculates a degree of relevance between the malicious IP host and other each IP host by DeepWalk (see Non Patent Literature 2) using the graph (see FIG. 4).

The graph correction unit 123 corrects the graph generated by the graph generation unit 121 on the basis of the degree of relevance between the IP host of interest and other each IP host calculated by the first degree of relevance calculation unit 122.

For example, in a case where there is no edge from the IP host of interest to an IP host having a degree of relevance equal to or greater than the predetermined value in the graph generated by the graph generation unit 121, the graph correction unit 123 adds an edge from the IP host of interest to the IP host having the degree of relevance equal to or greater than the predetermined value.

Figure 5:
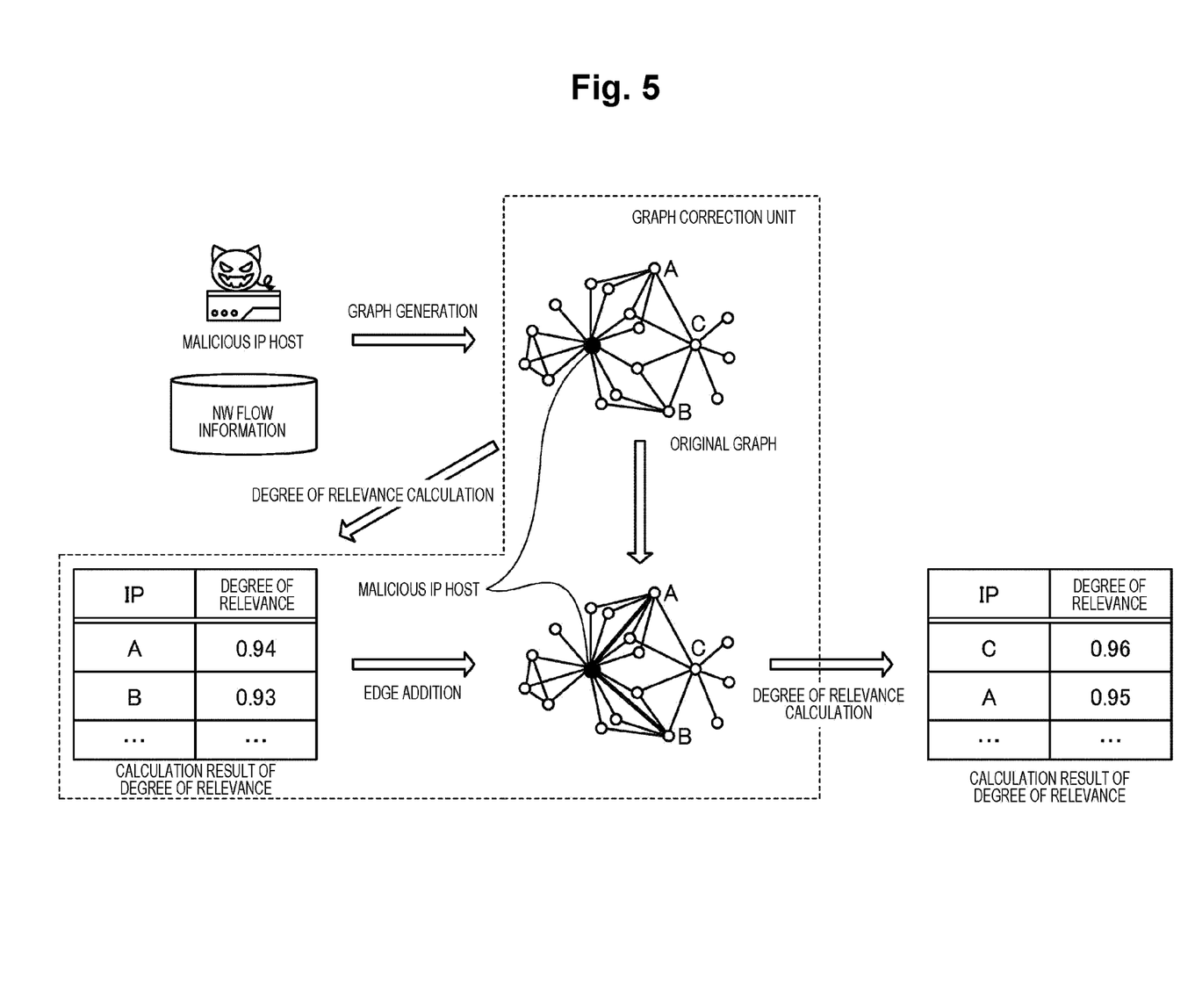
FIG. 5 is a diagram for describing a graph correction unit in FIG. 2.

For example, as illustrated in FIG. 5, in a case where there are no edges from the malicious IP host to IP hosts A and B having degrees of relevance to the malicious IP host equal to or greater than the predetermined value, the graph correction unit 123 adds edges from the malicious IP host to the IP hosts A and B.

Furthermore, in a case where there is an edge from the IP host of interest to an IP host having a degree of relevance less than the predetermined value in the graph generated by the graph generation unit 121, the graph correction unit 123 deletes the edge.

Figure 6:
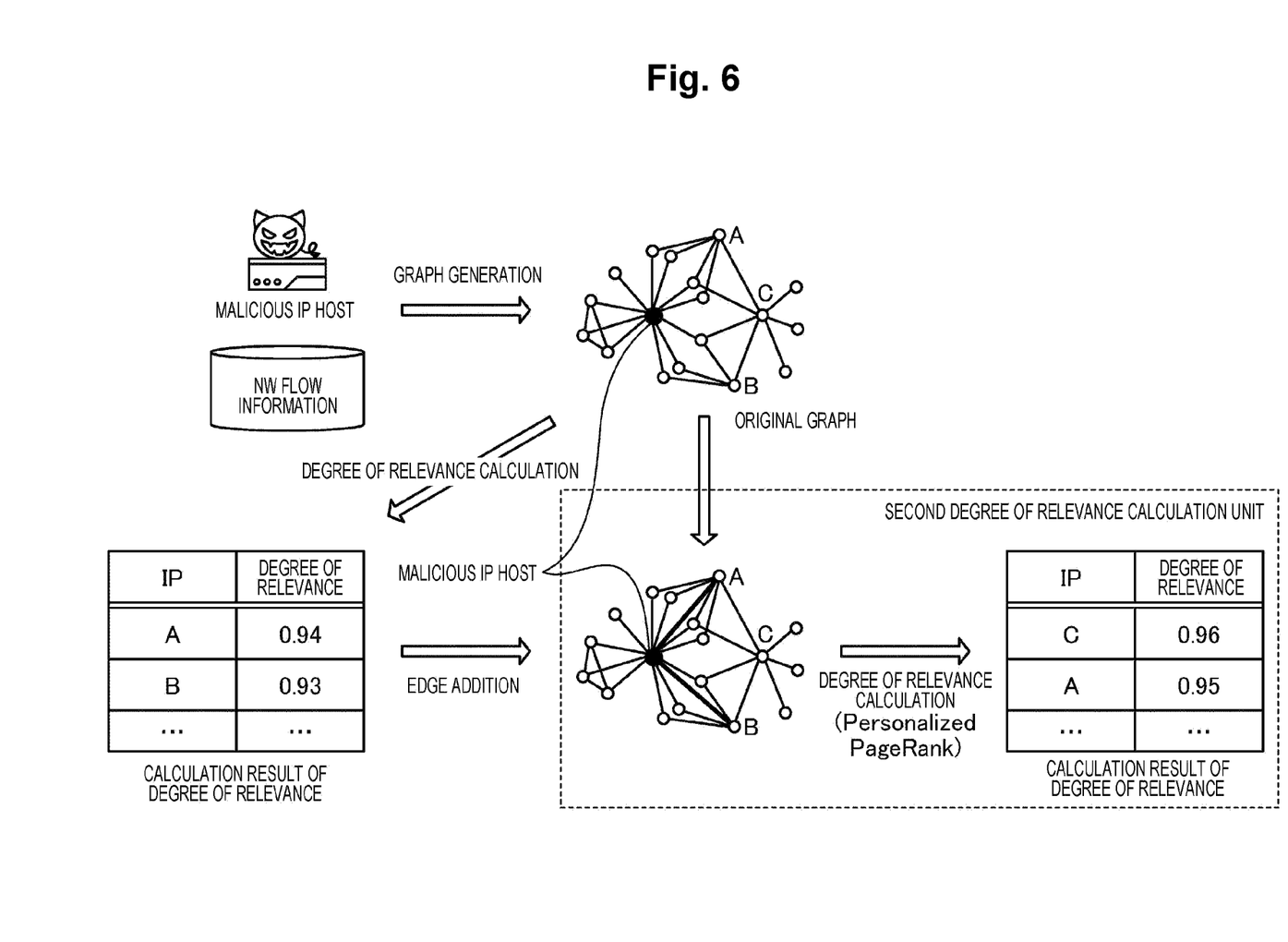
FIG. 6 is a diagram for describing a second degree of relevance calculation unit in FIG. 2.

The second degree of relevance calculation unit 124 calculates a degree of relevance between the IP host of interest and other each IP host using the graph corrected by the graph correction unit 123. For example, as illustrated in FIG. 6, the second degree of relevance calculation unit 124 calculates a degree of relevance between the malicious IP host and other each IP host by Personalized PageRank (see Non Patent Literature 1) using the corrected graph.

The first degree of relevance calculation unit 122 uses DeepWalk (see Non Patent Literature 2) and the second degree of relevance calculation unit 124 uses Personalized PageRank (see Non Patent Literature 1) to calculate the degree of relevance between the IP host of interest and other each IP host for the following reasons.

That is, a degree of relevance between IP hosts on a graph calculated by DeepWalk tends to be relatively high even between IP hosts arranged at a long distance on the graph. Furthermore, a degree of relevance between IP hosts on a graph calculated by Personalized PageRank tends to be higher between IP hosts arranged at a short distance on the graph.

Therefore, after the first degree of relevance calculation unit 122 calculates degrees of relevance between IP hosts on the graph using DeepWalk, the graph correction unit 123 performs graph correction (add and delete an edge) using the calculation result of the degrees of relevance, and the second degree of relevance calculation unit 124 uses Personalized PageRank for calculation of degrees of relevance between the IP hosts on the corrected graph, thereby the analysis device 10 can calculate degrees of relevance to the IP host of interest in consideration of both IP hosts at long distances and IP hosts at short distances from the IP host of interest on the graph.

Note that calculation algorithms used by the first degree of relevance calculation unit 122 and the second degree of relevance calculation unit 124 for calculating the degrees of relevance between the IP hosts on the graph can be set by a user of the analysis device 10. Although the calculation algorithms used by the first degree of relevance calculation unit 122 and the second degree of relevance calculation unit 124 are different from each other in the example described above, the calculation algorithms may be the same as each other.

The output processing unit 125 outputs a degree of relevance between the IP host of interest and other each IP host calculated by the second degree of relevance calculation unit 124. Note that the output processing unit 125 may output identification information of an IP host having a degree of relevance equal to or greater than the predetermined value to the IP host of interest on the basis of the degree of relevance to the IP host of interest calculated by the second degree of relevance calculation unit 124.

The output unit 13 outputs information output by the control unit 12. For example, the output unit 13 outputs the degree of relevance between the IP host of interest and other each IP host output by the output processing unit 125.

As described above, the analysis device 10 creates a graph in which each IP host indicated in NW flow information is set as a node and communication between each IP host is set as an edge, and calculates a degree of relevance between an IP host of interest and each IP host. Then, the analysis device 10 corrects an edge of the graph using the calculated degree of relevance. That is, in a case where there is an IP host that is not directly connected to the IP host of interest by an edge on the graph even though the degree of relevance to the IP host of interest is equal to or greater than the predetermined value, the analysis device 10 adds an edge with the IP host. Furthermore, in a case where there is an IP host that is directly connected to the IP host of interest by an edge on the graph even though the degree of relevance to the IP host of interest is less than the predetermined value, the analysis device 10 deletes the edge with the IP host.

The analysis device 10 recalculates the degree of relevance between the IP host of interest and other each IP host using the graph in which the edge has been corrected as described above, thereby obtaining the following effects. For example, as illustrated in FIG. 1, a case is considered in which, in the graph before correction, there are IP hosts A and B that are having high degrees of relevance to the IP host of interest (malicious IP host) but are not directly connected to the malicious IP host by edges, and an IP host C is connected to the IP hosts A and B by edges.

In this case, when the analysis device 10 calculates a degree of relevance between the malicious IP host and the IP host C using the graph before correction, the degree of relevance to the malicious IP host may not be so high. However, as described above, the analysis device 10 recalculates the degree of relevance between the malicious IP host and other each IP host using the graph in which correction has been performed such that the malicious IP host and the IP hosts A and B are connected by edges, so that the degree of relevance between the malicious IP host and other each IP host can be accurately calculated. As a result, for example, the analysis device 10 can extract the IP host C adjacent to the IP hosts A and B in FIG. 1 as an IP host having a high degree of relevance to the malicious IP host.

Figure 7:
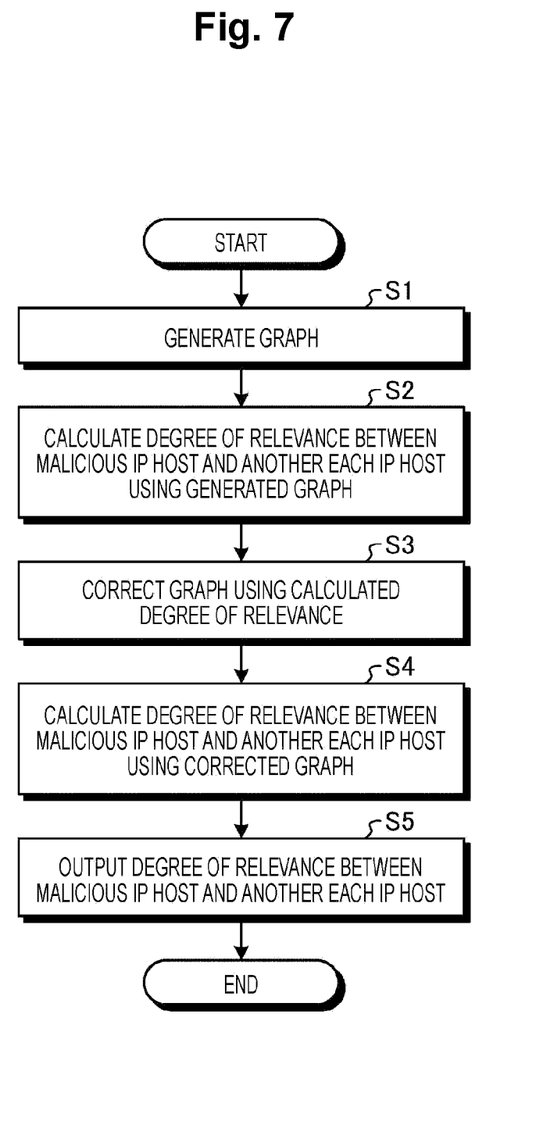
FIG. 7 is a flowchart illustrating an example of processing procedure of the analysis device.

[Example of Processing Procedure] Next, an example of a processing procedure of the analysis device 10 will be described with reference to FIG. 7. Here, a case where the analysis device 10 calculates a degree of relevance between a malicious IP host and each IP host using NW flow information will be described as an example.

First, the graph generation unit 121 of the analysis device 10 generates a graph in which each IP host indicated in the NW flow information is set as a node and communication between each IP host is set as an edge on the basis of information of the NW flow information (S1). Furthermore, the graph generation unit 121 stores a node corresponding to the malicious IP host on the generated graph. Next, the first degree of relevance calculation unit 122 calculates a degree of relevance between the malicious IP host and other each IP host using the graph generated in S1 (S2).

After S2, the graph correction unit 123 corrects the graph generated in S1 using the degree of relevance calculated in S2 (S3). For example, in a case where there is no edge from the malicious IP host to an IP host having a degree of relevance equal to or greater than the predetermined value on the graph generated in S1, the graph correction unit 123 adds an edge from the malicious IP host to the IP host. Furthermore, in a case where there is an edge from the malicious IP host to an IP host having a degree of relevance less than the predetermined value on the graph generated in S1, the graph correction unit 123 deletes the edge.

After S3, the second degree of relevance calculation unit 124 calculates a degree of relevance between the malicious IP host and each IP host using the graph corrected in S3 (S4). Then, the output processing unit 125 outputs the degree of relevance between the malicious IP host and each IP host calculated in S4 (S5).

In this way, the analysis device 10 can accurately calculate the degree of relevance between the malicious IP host and each IP host.

Note that, in the above-described embodiment, the graph correction unit 123 of the analysis device 10 adds and deletes an edge of the graph generated by the graph generation unit 121 on the basis of the degree of relevance between the IP host of interest and other each IP host calculated by the first degree of relevance calculation unit 122, but only the addition of an edge or only the deletion of an edge may be performed.

[System Configuration and Others] Each component of each unit illustrated in the drawings is functionally conceptual and does not necessarily need to be physically configured as illustrated in the drawings. In other words, a specific form of distribution and integration of individual devices is not limited to the illustrated form, and all or part thereof can be functionally or physically distributed and integrated in any unit according to various loads, usage conditions, and the like. Further, all or any part of each processing function performed in each device can be implemented by a CPU and a program to be executed by the CPU or can be implemented as hardware by wired logic.

In the processing described in the above embodiment, all or part of processing described as being automatically performed may be manually performed, or all or part of processing described as being manually performed may be automatically performed by a known method. The processing procedure, the control procedure, the specific name, and the information including various types of data and parameters that are illustrated in the literatures and the drawings can be freely changed unless otherwise specified.

[Program] The analysis device 10 described above can be implemented by a program being installed in a desired computer as package software or online software. For example, by an information processing device being caused to execute the above-described program, the information processing device can be caused to function as the analysis device 10. The information processing device mentioned here includes a desktop or a laptop personal computer. In addition, the information processing device also includes a mobile communication terminal such as a smartphone, a mobile phone, and a personal handy-phone system (PHS) and a terminal such as a personal digital assistant (PDA).

In a case where a terminal device to be used by a user may be implemented as a client, the analysis device 10 may also be implemented as a server device that provides a service related to the above-described processing to the client. In this case, the server device may be implemented as a web server or may be implemented as a cloud that provides a service related to the above-described processing by outsourcing.

Figure 8:
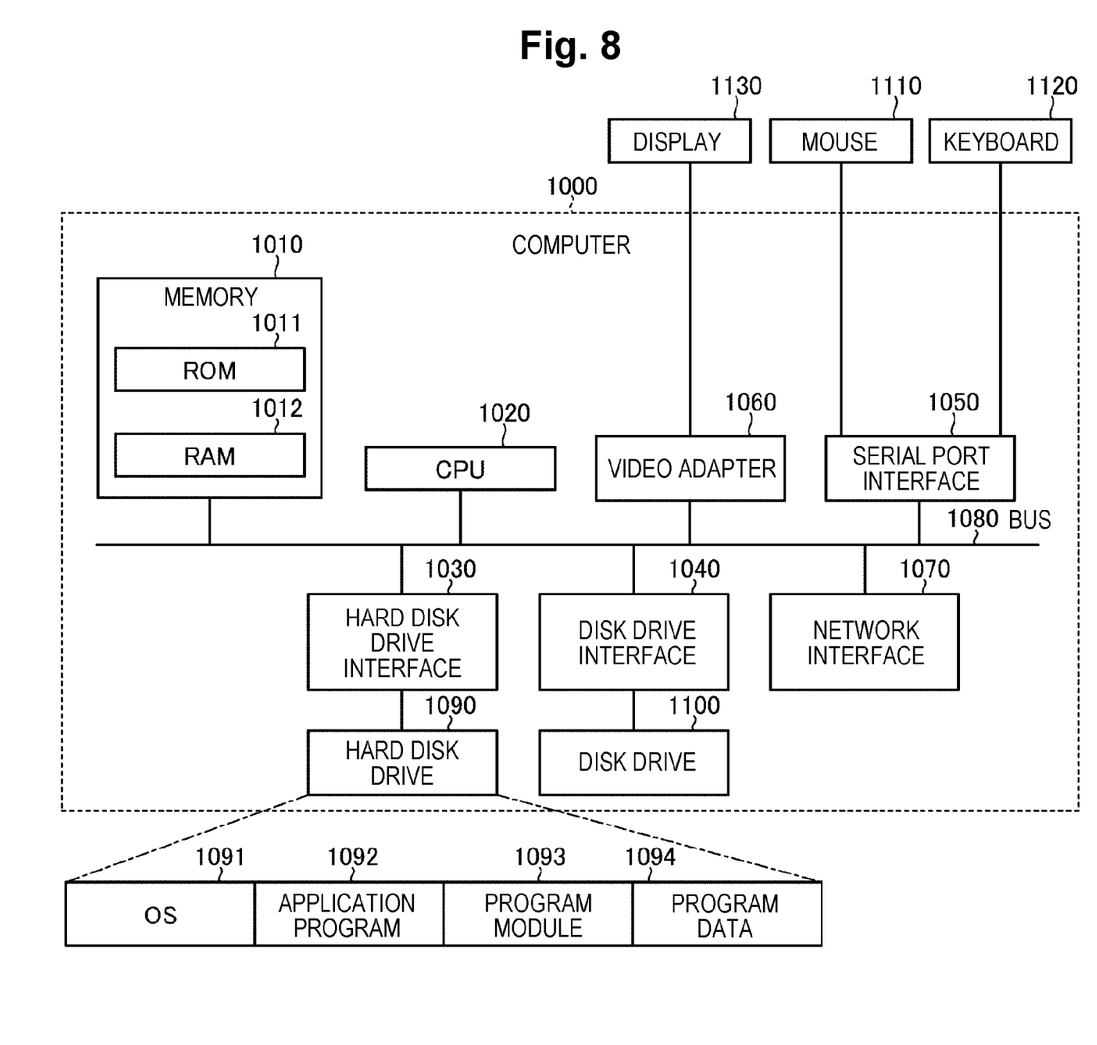
FIG. 8 is a diagram illustrating an example of a computer that executes an analysis program.

FIG. 8 illustrates an example of a computer that executes an analysis program. A computer 1000 includes, for example, a memory 1010 and a CPU 1020. Furthermore, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected with, for example, a display 1130.

The hard disk drive 1090 stores, for example, an OS 1091, an application program 1092, a program module 1093, and program data 1094. In other words, a program that defines each type of processing to be executed by the analysis device 10 is implemented as the program module 1093 in which codes executable by the computer are described. The program module 1093 is stored in, for example, the hard disk drive 1090. For example, the program module 1093 for executing processing similar to the functional configuration in the analysis device 10 is stored in the hard disk drive 1090. Note that the hard disk drive 1090 may be replaced with a solid state drive (SSD).

Moreover, data used in the processing of the above embodiment is stored in, for example, the memory 1010 or the hard disk drive 1090 as the program data 1094. In addition, the CPU 1020 reads the program module 1093 and the program data 1094 stored in the memory 1010 and the hard disk drive 1090 to the RAM 1012 as necessary and executes the program module 1093 and the program data 1094.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

REFERENCE SIGNS LIST

10 analysis device
11 input unit
12 control unit
13 output unit
121 graph generation unit
122 first degree of relevance calculation unit
123 graph correction unit
124 second degree of relevance calculation unit
125 output processing unit

The invention claimed is:

1. An analysis device comprising:
processing circuitry configured to:
generate, based on data traffic information of a plurality of Internet Protocol (IP) hosts in a network, a graph, wherein the graph comprises a plurality of IP hosts as respective nodes and communication between a first IP host of the plurality of IP hosts and a second IP host of the plurality of IP hosts as an edge;
identify, based on similarity of neighborhoods between a predetermined IP host of the plurality of IP hosts and the first IP host of the plurality of IP hosts on the graph, a first degree of relevance between the predetermined IP host of the plurality of IP hosts and the first IP host of the plurality of IP hosts on the generated graph, wherein the predetermined IP host represents a malicious IP host that cause one or more IP hosts of the plurality of IP hosts to perform relevant malicious operations;
update, based on a first predetermined threshold degree of relevance and the first degree of relevance between the predetermined IP host and the first IP host, the generated graph by modifying an edge connecting the predetermined IP host and the first IP host;
identify, based on the updated graph according to the modified edge, a second degree of relevance between the predetermined IP host and the first IP host; and
identify and extract, based on a second predetermined threshold degree of relevance and the identified second degree of relevance between the predetermined IP host and the first IP host, the first IP host from the network as relevant to the malicious IP host.

2. The analysis device according to claim 1, wherein the processing circuitry is further configured to update the graph by adding an edge from the predetermined IP host to an IP host having the first degree of relevance equal to or greater than the first predetermined threshold degree of relevance in a case where there is no edge from the predetermined IP host to the IP host having the first degree of relevance equal to or greater than the first predetermined threshold degree of relevance in the graph.

3. The analysis device according to claim 1, wherein the processing circuitry is further configured to update the graph by deleting the edge in a case where the edge from the predetermined IP host to the first IP host has the first degree of relevance less than the first predetermined threshold degree of relevance in the graph.

4. The analysis device according to claim 1, wherein the processing circuitry is further configured to calculate the second degree of relevance by a predetermined calculation algorithm.

5. The analysis device according to claim 1, wherein the processing circuitry is further configured to:
calculate the first degree of relevance between the predetermined IP host and the first IP host using the graph by Deep Walk, and
calculate the second degree of relevance between the predetermined IP host and the first IP host using the updated graph by Personalized PageRank.

6. The analysis device according to claim 1, wherein
the predetermined IP host represents the malicious IP host designated in advance, the predetermined IP host corresponds to a predetermined node of the graph, and the predetermined host communicates with the first IP host of the plurality of IP hosts over the network.

7. An analysis method performed by an analysis device, the analysis method comprising:
generating, based on data traffic information of a plurality of Internet Protocol (IP) hosts in a network, a graph, wherein the graph comprises a plurality of IP hosts as respective nodes and communication between a first IP host of the plurality of IP hosts and a second IP host of the plurality of IP hosts as an edge;
identifying, based on similarity of neighborhoods between a predetermined IP host of the plurality of IP hosts and the first IP host of the plurality of IP hosts in the graph, a first degree of relevance between the predetermined IP host of the plurality of IP hosts and the first IP host of the plurality of IP hosts on the generated graph, wherein the predetermined IP host represents a malicious IP host that cause one or more IP hosts of the plurality of IP hosts to perform relevant malicious operations;
updating, based on a first predetermined threshold degree of relevance and the first degree of relevance between the predetermined IP host and the first IP host, the generated graph by modifying an edge connecting the predetermined IP host and the first IP host;
identifying, based on the updated graph according to the modified edge, calculating a second degree of relevance between the predetermined IP host and the first IP host; and
identifying and extracting, based on a second predetermined threshold degree of relevance and the identified second degree of relevance between the predetermined IP host and the identified first IP host, the first IP host from the network as relevant to the malicious IP host.

8. A non-transitory computer-readable recording medium storing therein an analysis program that causes a computer to execute a process comprising:

generating, based on data traffic information of a plurality of Internet Protocol (IP) hosts in a network, a graph, wherein the graph comprises a plurality of IP hosts as respective nodes and communication between a first IP host of the plurality of IP hosts and a second IP host of the plurality of IP hosts as an edge;

identifying, based on similarity of neighborhoods between a predetermined IP host of the plurality of IP hosts and the first IP host of the plurality of IP hosts on the graph, a first degree of relevance between the predetermined IP host of the plurality of IP hosts and the first IP host of the plurality of IP hosts on the generated graph, wherein the predetermined IP host represents a malicious IP host that cause one or more IP hosts of the plurality of IP hosts to perform relevant malicious operations;

updating, based on a first predetermined threshold degree of relevance and the first degree of relevance between the predetermined IP host and the first IP host, the generated graph by modifying an edge connecting the predetermined IP host and the first IP host;

identifying, based on the updated graph according to the modified edge, calculating a second degree of relevance between the predetermined IP host and the first IP host; and identifying and extracting, based on a second predetermined threshold degree of relevance and the identified second a degree of relevance between the predetermined IP host and the identified first IP host, the first IP host from the network as relevant to the malicious IP host.

\* \* \* \* \*